United States Patent
Bae et al.

(10) Patent No.: US 7,302,283 B2
(45) Date of Patent: Nov. 27, 2007

(54) PORTABLE DIGITAL COMMUNICATION APPARATUS HAVING IMPROVED GRIP

(75) Inventors: Dong-Won Bae, Daegu (KR); Eon-Seog Cheon, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 76 days.

(21) Appl. No.: 11/006,765

(22) Filed: Dec. 8, 2004

(65) Prior Publication Data

US 2005/0176479 A1   Aug. 11, 2005

(30) Foreign Application Priority Data

Feb. 9, 2004   (KR) .................. 10-2004-0008411

(51) Int. Cl.
*H04M 1/00* (2006.01)
*H04M 9/00* (2006.01)
*H04Q 7/20* (2006.01)
*H04B 1/38* (2006.01)

(52) U.S. Cl. .................. 455/575.4; 455/456; 455/90.3; 379/433

(58) Field of Classification Search .......... 455/575.1, 455/575.2, 575.3, 575.4, 90, 90.1
See application file for complete search history.

(56) References Cited

U.S. PATENT DOCUMENTS

| | | | |
|---|---|---|---|
| 6,463,262 B1 * | 10/2002 | Johnson et al. ............ 455/90.1 |
| 6,766,181 B1 * | 7/2004 | Newman et al. ......... 455/575.3 |
| 6,975,889 B2 * | 12/2005 | Chen et al. ............... 455/575.1 |
| 6,980,840 B2 * | 12/2005 | Kim et al. ................ 455/575.4 |
| 2003/0064688 A1 * | 4/2003 | Mizuta et al. ................ 455/90 |

* cited by examiner

*Primary Examiner*—Joseph Feild
*Assistant Examiner*—Kiet Doan
(74) *Attorney, Agent, or Firm*—Roylance, Abrams, Berdo & Goodman, L.L.P.

(57) ABSTRACT

A portable digital communication apparatus having an improved grip comprising a body housing extending along a longitudinal direction and a grip portion adapted to slide a predetermined distance in a direction away from an end of the body housing for an improved grip. The grip portion is slid during a photographing mode to provide a user with an improved grip.

8 Claims, 6 Drawing Sheets

PORTABLE DIGITAL COMMUNICATION APPARATUS HAVING IMPROVED GRIP

CROSS-REFERENCE TO RELATED APPLICATION

This application claims the benefit under 35 U.S.C. §119 (a) of an application entitled "Portable Digital Communication Apparatus Having Improved Grip" filed with the Korean Intellectual Property Office on Feb. 9, 2004 and assigned Ser. No. 2004-8411the entire contents of which are hereby incorporated by reference.

BACKGROUND OF THE INVENTION

1. Field of the Invention

The present invention relates to portable communication apparatuses including cellular phones, PDAs (personal digital assistants), HHPs (hand held phones), and digital communication apparatuses. More particularly, the present invention relates to a portable digital communication apparatus having an improved grip so that its body housing can be held conveniently in a photographing mode.

2. Description of the Related Art

In general, a "portable communication apparatus" refers to an electronic apparatus which a user can carry with him to perform wireless communication with a desired partner. In consideration of portability, designs of such portable communication apparatuses follow the trend toward compactness, slimness, and lightness, but also toward multimedia availability, and, therefore, have a wider variety of functions and capabilities. In particular, future portable communication apparatuses are expected to incorporate greater multi-functionality and multi-purpose utilization, as well as even greater compactness and lightness, but also will be modified to be suitable for various multimedia environments or Internet environments. Additionally, such portable communication apparatuses are now commonly used by all kinds of people, including men and women, and the young and the old, throughout the world, and are recognized by some people as a nearly indispensable commodity, which must be always carried.

Conventional portable communication apparatuses may be classified into various types of apparatuses according to their appearance, such as bar-type portable communication apparatuses, flip-type portable communication apparatuses, and folder-type portable communication apparatuses. Portable communication apparatuses may also be classified into a neck wearable-type communication apparatuses and wrist wearable-type communication apparatuses according to the position at or the way in which a user puts on the communication apparatus. Additionally, portable communication apparatuses may be classified into rotation-type communication apparatuses and sliding-type communication apparatuses according to the way the communication apparatus opens and closes. These variously classified portable communication apparatuses can be easily understood by those skilled in the art.

Meanwhile, conventional portable communication apparatuses now tend to have the capability of transmitting data at a high speed in addition to the basic function of performing voice communication. In other words, according to the increased demand by consumers, portable communication apparatuses now tend to provide service using wireless communication technology capable of transmitting data at a high speed.

Conventional portable communication apparatuses are equipped with a speaker device, a display device, a microphone device, keys, a communication antenna device, and a battery.

According to current trends, portable communication apparatuses are equipped with a camera lens to transmit video signals. Particularly, portable communication apparatuses are generally equipped with a camera lens to take pictures of a desired object or to perform video communication.

When conventional portable digital communication apparatuses equipped with a camera lens are used in a photographing mode, the camera lens is focused on the object and pictures are taken while watching the display device. This makes the grip unstable. If the body housing is made longer for an improved grip, the apparatuses cannot be made in a compact size. If the body housing is made short for a compact size, the grip stability deteriorates. Accordingly, there is a need for a portable digital communication apparatus capable of making the body housing in a compact size, while improving the grip in a photographing mode at the same time.

SUMMARY OF THE INVENTION

Accordingly, the present invention has been made to solve the above-mentioned problems occurring in the prior art, and an object of the present invention is to provide a portable digital communication apparatus having a body comprising a compact size and improved grip.

Another object of the present invention is to provide a portable digital communication apparatus having an improved grip in a photographing mode.

Still another object of the present invention is to provide a portable digital communication apparatus having a grip portion, which a user can slide as desired.

In order to accomplish this object, there is provided a portable digital communication apparatus comprising a body housing extending along a longitudinal direction and a grip portion adapted to slide a predetermined distance in a direction away from an end of the body housing for an improved grip.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description of the present invention, a detailed description of known functions and configurations incorporated herein has been omitted for the sake of clarity.

Figure 1:
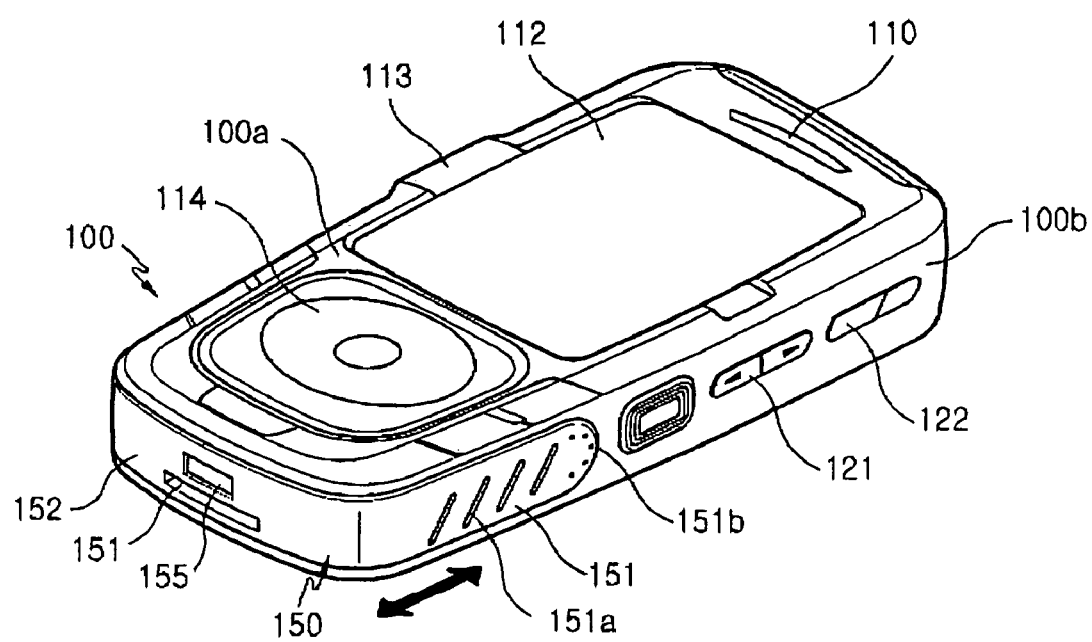
FIG. 1 is a perspective view showing a portable digital communication apparatus according to an embodiment of the present invention.
Figure 2:
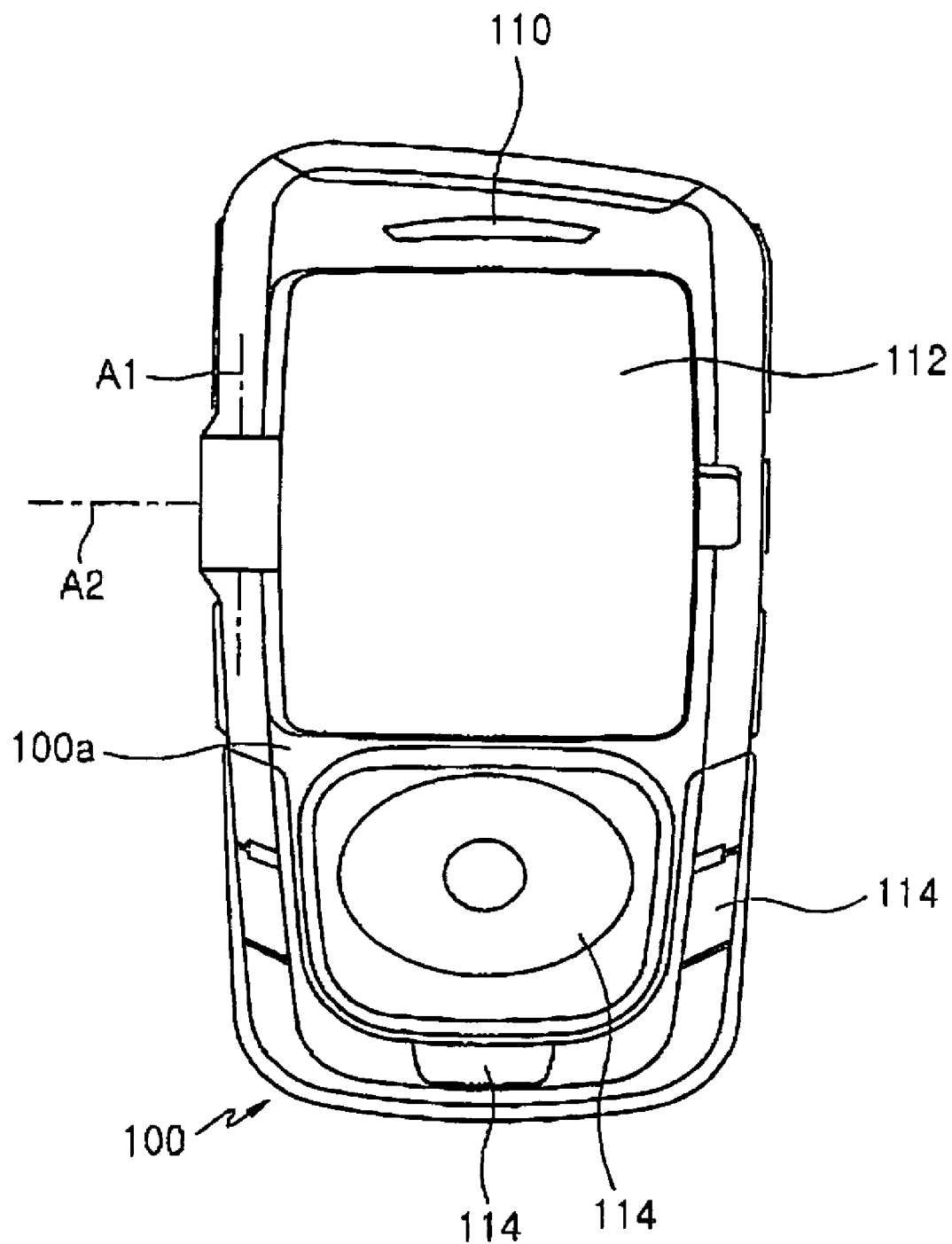
FIG. 2 is a front view of the portable digital communication apparatus shown in FIG. 1.
Figure 3:
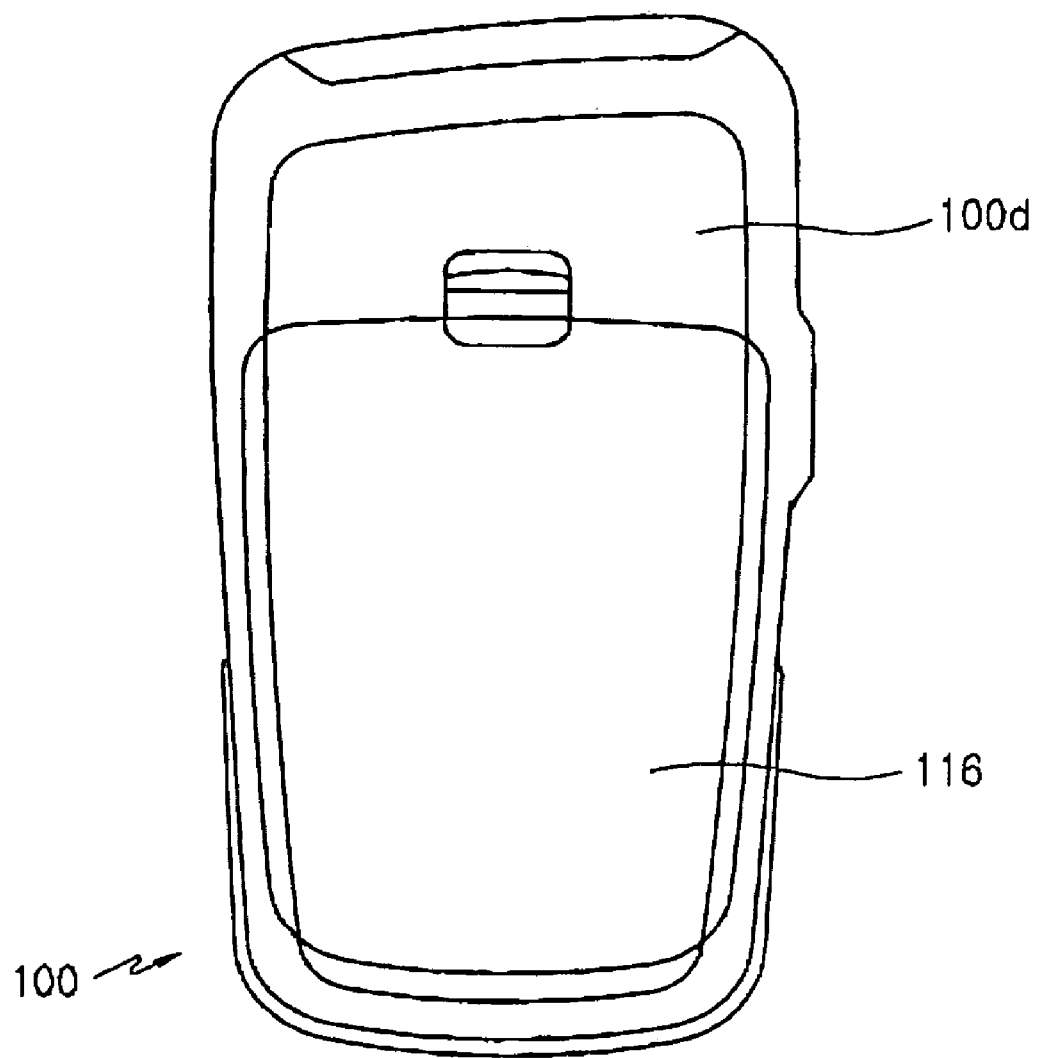
FIG. 3 is a rear view of the portable digital communication apparatus shown in FIG. 1.

As shown in FIGS. 1 to 3, a portable digital communication apparatus according to an embodiment of the present invention has a body housing 100 and a grip portion 150 adapted to slide on the body housing 100 along the longitudinal direction thereof for an improved grip. In particular, the grip portion 150 is operated manually to improve the grip in a photographing mode. When the apparatus is used in a photographing mode, a user holds a portion of the body housing 100 on which a first key array 114 is positioned, which can be a portion below a display device, and takes pictures of objects. If the portion on which the first key array 114 is positioned (such as, the lower portion of the body housing 100) is short, the apparatus may become unstable and inconvenient to use when hand-held. According to an embodiment of the present invention, the grip portion 150 is preferably slid a predetermined distance from the body housing 100 for improved grip and stable use of the camera within the portable digital communication apparatus.

More specifically, the portable digital communication apparatus comprises a body housing 100 and a grip portion 150 adapted to slide a predetermined distance in a direction away from the body housing 100, while being restrained on one end of the body housing 100, so that the length of the apparatus, which a user can hold by a hand is extended for improved grip. The preferably bar-shaped body housing 100 extends along a longitudinal direction and has a top surface 100a, a bottom surface 110d, a front surface 100e, a lateral surface 100b, and the other lateral surface 100c. The top surface 100a has an antenna device (not shown) embedded therein, a speaker device 110, a display device 112, and a first key array 114 composed of a number of keys positioned thereon. The first key array preferably comprises numeric keys, character keys, menu keys, a confirmation key, a cancel key, an MP3 operation key, and a speech key.

Figure 4:
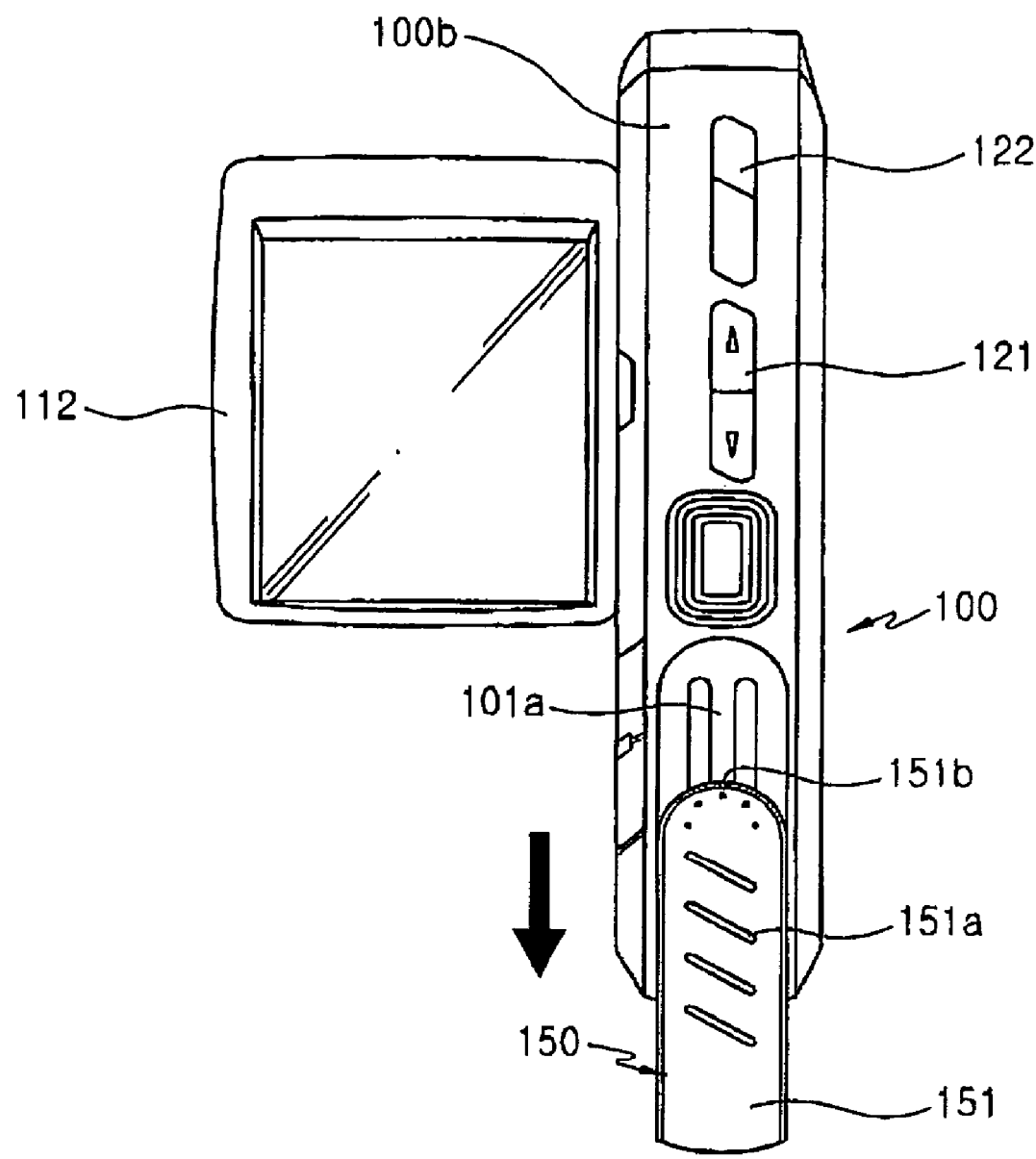
FIG. 4 is a lateral view of a portable digital communication apparatus according to an embodiment of the present invention wherein its display device is rotated 90° about a first hinge axis and its grip portion is completely slid.
Figure 5:
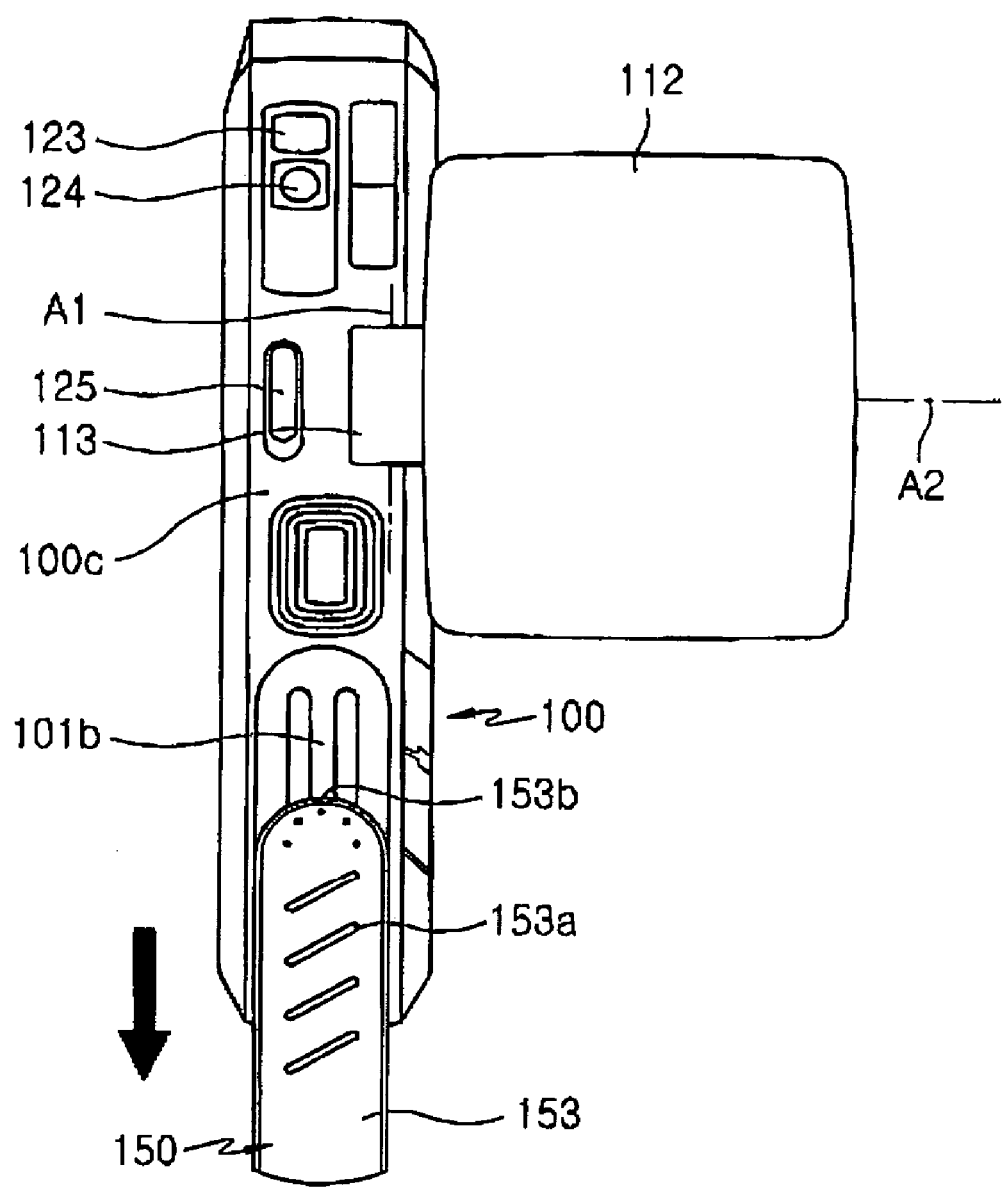
FIG. 5 is a lateral view of the portable digital communication apparatus shown in FIG. 4 seen from the other side.

The display device 112 is connected to the upper portion of the body housing in such a manner that it can be rotated about first and second hinge axes A1 and A2 by a hinge arm 113. If the display device 112 is rotated about the first hinge axis A1, which is the first rotation axis thereof, it is moved away from the top surface 100a of the body housing 100 as shown in FIGS. 4 and 5. After being rotated about the first hinge axis A1, the display device 112 is rotated 180° about the second hinge axis A2 and then about the first hinge axis A1. The result is shown in FIG. 6.

The body housing has a second key array 121 and 122 composed of a number of keys positioned on the lateral surface 100b thereof as shown in FIG. 4. The second key array comprises a volume key and a camera shutter key.

The body housing has a third key array 125 composed of a number of keys, a camera lens 123, and a lighting device 124 positioned on the other lateral surface 100c thereof as shown in FIG. 5. The third key array 125 is disposed adjacently to the camera lens 123 and the camera lens 123 is adjacent to the light device 124. The third key array refers to a hold key.

Figure 6:
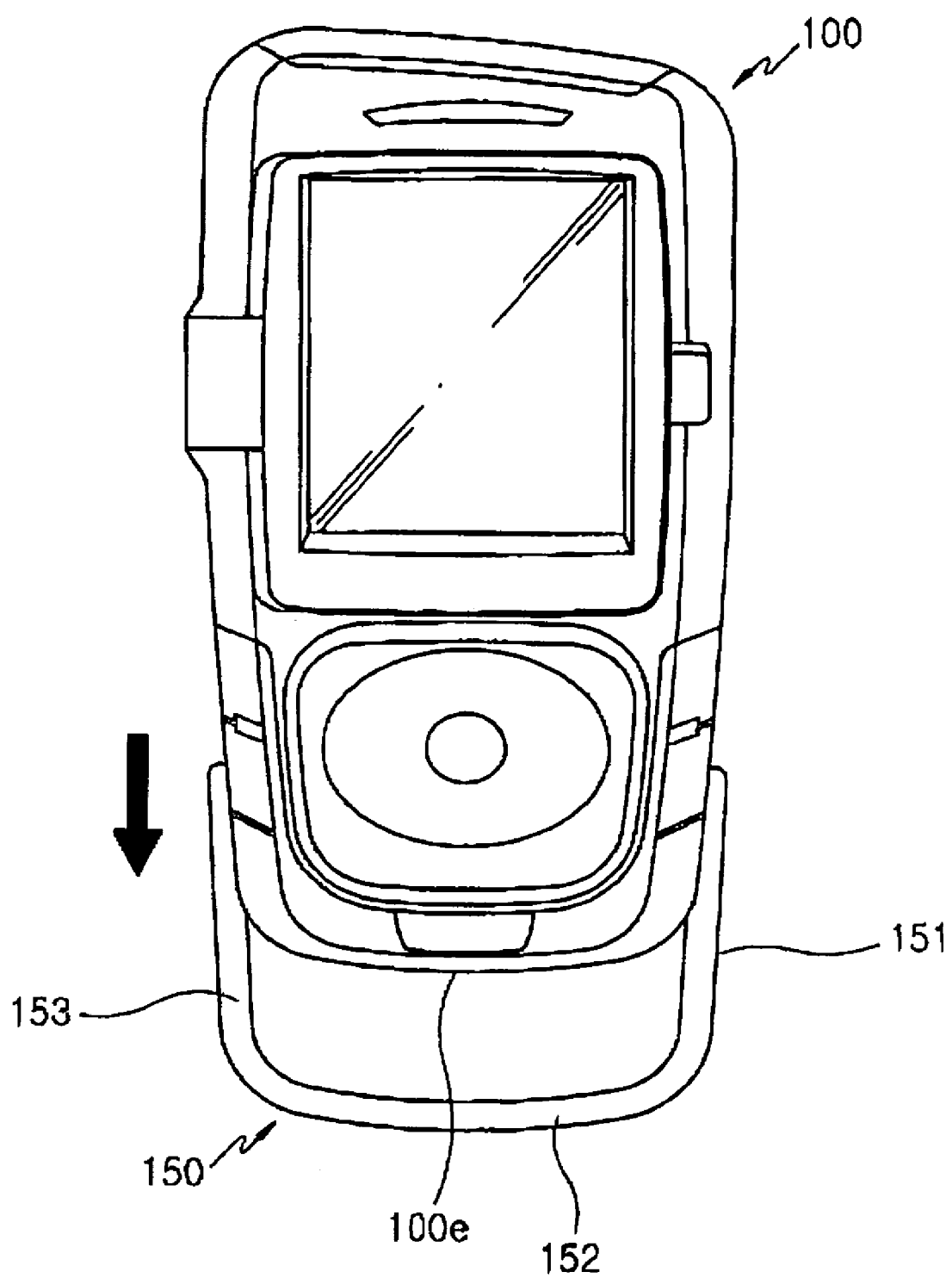
FIG. 6 is a lateral view of a portable digital communication apparatus according to an embodiment of the present invention wherein its display device is rotated about first and second hinge axes and its grip portion is completely slid.

As shown in FIGS. 4 to 6, the grip portion 150 is composed of a center portion 152 positioned on the front surface 100e of the body housing, an end portion 151 positioned on the lateral surface 100b which is disposed adjacently to the front surface 100e, and the other end portion 153 positioned on the other lateral surface 100c which is also disposed adjacently to the first surface 100e. The center portion 152 and the end portions 151 and 153 constitute a single unit. An end 151b and the other end 153b of the grip portion preferably have a semi-circular shape. The end portions 151 and 153 of the grip portion have a number of protrusions 151a and 153a, respectively, for smooth sliding movement.

The grip portion has at least one opening formed on the center portion 152 thereof as shown in FIG. 1, including an IF (interface) connector opening 155 and a card slot opening 156, which are preferably disposed adjacently to each other.

The body housing has first and second recesses 101a and 101b (shown in FIGS. 4 and 5, respectively) formed on the lateral surfaces 100b and 100c thereof, respectively, with a predetermined depth. The recesses 101a and 101b correspond to the end portions 151 and 153 of the grip portion 150, respectively, and receive the grip portion 150 therein to guide the sliding thereof in a safe manner.

The sliding mode of the grip portion 150 is not limited to the embodiments of the present invention described and may be manual, semi-automatic, or automatic.

When the grip portion 150 is completely slid from the body housing 100 as shown in FIG. 6, the front surface 100e of the body housing is spaced from the center portion 152 of the grip portion.

In a camera operation mode for photographing as shown in FIGS. 4 to 6, a user focuses the camera lens on a desired object and takes pictures thereof while watching the display device.

While the invention has been shown and described with reference to certain preferred embodiments thereof, it will be understood by those skilled in the art that various changes in form and details may be made therein without departing from the spirit and scope of the invention as defined by the appended claims. For example, the grip portion for improved grip according to embodiments of the present invention is equally applicable to all kinds of portable electronic apparatuses including bar-type communication apparatuses, folder-type portable apparatuses, and sliding-type portable apparatuses. As mentioned above, the present invention provides a grip portion adapted to selectively slide for improved grip, in particular, in a camera operation mode for photographing and enables more convenient use.

What is claimed is:

1. A portable digital communication apparatus, comprising:
    a body housing extending along a longitudinal direction, the body housing comprising a top surface, a bottom surface, a front surface, and two oppositely disposed lateral surfaces; and
    a substantially U-shaped grip portion slidably connected to the two lateral surfaces of the body housing and adapted to slide in a direction away from an end of the body housing for an improved grip,
    wherein the grip portion is composed of a center portion and two end portions that constitute a single unit so that, when the grip portion is slid from the body housing, the body housing is spaced apart from the center portion of the grip portion, wherein
    the grid portion has a number of openings, and further wherein the opening include an IF connector opening and a card slot opening which are positioned adjacently to each other.

2. A portable digital communication apparatus as claimed in claim 1, wherein the body housing has first and second recesses formed on both lateral surfaces thereof, respectively, for safe sliding of the grip portion.

3. A portable digital communication apparatus as claimed in claim 1, wherein the center portion is positioned on the front surface of the body housing and both end portions are positioned on both lateral surfaces of the body housing, which are disposed adjacently to the front surface.

4. A portable digital communication apparatus as claimed in claim 1, wherein both ends of the grip portion have a semi-circular shape.

5. A portable digital communication apparatus as claimed in claim 3, wherein the center portion and the front surface are spaced apart from each other when the grip portion is slid a predetermined distance from the body housing.

6. A portable digital communication apparatus as claimed in claim 1, wherein the body housing comprises:
    a speaker device positioned on the top surface thereof;
    a hinge arm having a first hinge axis of rotation and a second hinge axis of rotation, the second hinge axis being substantially perpendicular to the first hinge axis;
    a display device positioned adjacently to the speaker device and rotatably connected to the body housing by the hinge arm;
    a first key array composed of a number of keys positioned adjacently to the display device;
    a second key array composed of a number of keys positioned on a lateral surface thereof;
    a camera lens positioned on the other lateral surface thereof; and
    a lighting device positioned adjacently to the camera lens.

7. A portable digital communication apparatus as claimed in claim 1, wherein the grip portion has a number of protrusions for smoothing the sliding movement.

8. A portable digital communication apparatus as claimed in claim 1, wherein an open space is formed between the center portion of the grip portion and the body housing when the grip portion is slid away from the body housing.

* * * * *